United States Patent [19]

Schmidt

[11] 4,432,688
[45] Feb. 21, 1984

[54] TIPPLE

[76] Inventor: Christian E. Schmidt, Rte. 5, Box 650, Easton, Md. 21601

[21] Appl. No.: 296,847

[22] Filed: Aug. 27, 1981

[51] Int. Cl.³ .............................................. B65G 67/48
[52] U.S. Cl. .................................................... 414/358
[58] Field of Search ............... 414/354, 358, 359, 360, 414/361, 364, 366, 371, 372, 576, 579, 681

[56] References Cited

U.S. PATENT DOCUMENTS

| | | | |
|---|---|---|---|
| 17,114 | 4/1857 | Pearce et al. | 414/359 |
| 304,831 | 9/1884 | Leavitt | 414/360 |
| 327,506 | 9/1885 | Wolcott | 414/360 |
| 563,939 | 7/1896 | McBride et al. | 414/359 |
| 568,369 | 9/1896 | Randolph | 414/358 |
| 855,267 | 5/1907 | Tuttle | 414/357 |
| 1,195,398 | 8/1916 | Richeson | 414/358 |
| 1,380,745 | 6/1921 | Smith | 414/357 |
| 1,426,027 | 8/1922 | Wood | 414/359 |
| 1,447,428 | 3/1923 | Ramsay | 414/359 |
| 1,566,506 | 12/1925 | Reese et al. | 414/359 |
| 1,686,420 | 10/1928 | Repko | 414/359 |
| 2,344,742 | 3/1944 | Shields et al. | 414/361 |
| 2,752,053 | 6/1956 | Schwartz et al. | 414/681 |
| 3,232,459 | 2/1966 | Sabin | 414/361 |
| 3,760,961 | 9/1973 | Haditsch | 414/359 |
| 3,777,914 | 12/1973 | Cheek et al. | 414/360 |

FOREIGN PATENT DOCUMENTS

| | | | |
|---|---|---|---|
| 661929 | 10/1928 | France | 414/359 |
| 106394 | 5/1917 | United Kingdom | 414/358 |
| 374643 | 6/1932 | United Kingdom | 414/358 |

*Primary Examiner*—Robert B. Reeves
*Assistant Examiner*—Donald Hajec
*Attorney, Agent, or Firm*—Roylance, Abrams, Berdo & Goodman

[57] ABSTRACT

A tipple comprising a fixed support having two horizontal parallel rails with inboard and outboard ends and a cradle assembly mounted on the rails including two rocker members each with a curved surface engaging the rails. The cradle assembly supports a vehicle on the rocker members with the center of gravity of the vehicle located relative to the curved surfaces such that the cradle assembly with a loaded vehicle thereon freely rolls from a normal, vertical position through an angle of about 135° to a dumping position. Once the contents of the vehicle have been discharged, the cradle assembly automatically and freely rolls back to its vertical position. The curvature of the curved surface can be formed such that the radial distances from the center of gravity of the vehicle to each curved surface decreases along the curvature. A spring arrangement can be coupled at its opposite ends to the upper ends of the fixed support and cradle assembly to prevent rolling of the cradle through an angle of greater than about 135° and for initiating rolling of the cradle back to its vertical position after unloading.

12 Claims, 4 Drawing Figures

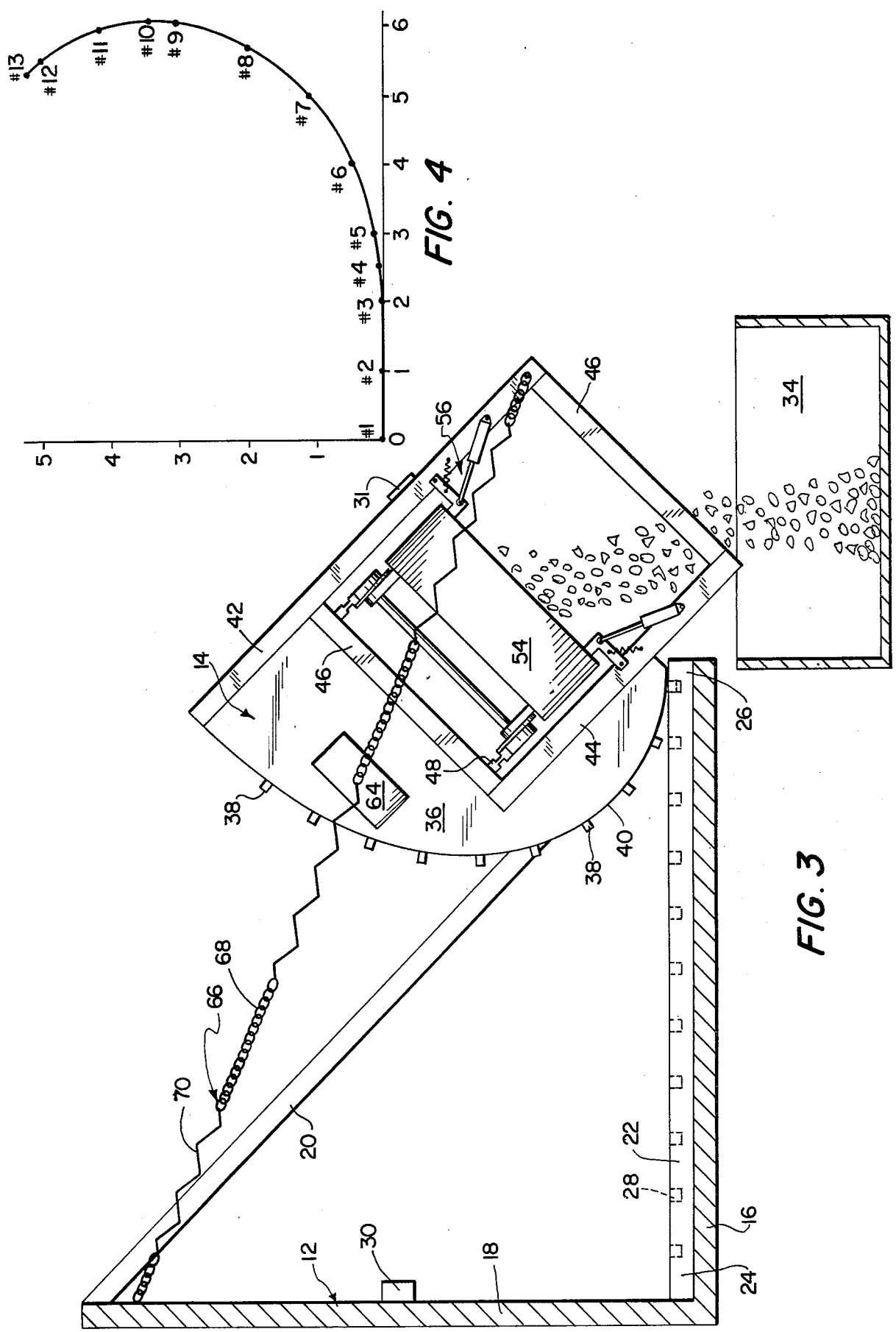

TIPPLE

BACKGROUND OF THE INVENTION

1. Field of the Invention

The present invention relates to a tipple, that is, an apparatus for emptying loaded vehicles by tipping the loaded vehicles while on a framework. For example, the vehicles can be railroad cars carrying particulate matter such as coal.

2. Description of the Prior Art

In systems for unloading vehicles, such as railroad cars filled with particulate matter (e.g., coal, grain or gravel), it is advantageous to turn the railroad car generally about its longitudinal axis to quickly and simply dump its contents. Only in this manner can these vehicles be unloaded in an efficient manner without constructing them and/or their unloading device in a complicated manner.

While various dumping systems for vehicles have been known in the art, they have tended to be cumbersome, complicated and expensive to construct. Additionally, many of these devices do not operate efficiently in that they do not roll the vehicle through a sufficient angle, have large power requirements or do not operate quickly. Typical conventional tipple systems are disclosed in the following U.S. Pat. Nos. 17,114 to Pearce et al; 304,831 to Leavitt; 327,506 to Wolcott; 563,939 to McBride et al; 855,267 to Tuttle; 1,195,398 to Richeson; 1,380,745 to Smith; 1,426,027 to Wood; 1,566,506 to Reese et al; 1,686,420to Repko; 2,344,742 to Shields et al; 3,232,459 to Sabin; and 3,760,961 to Habitsch.

SUMMARY OF THE INVENTION

Accordingly, it is a primary object of the present invention to provide a tipple which will dump a loaded vehicle under the force of gravity by freely rolling the loaded vehicle from a normal, vertical position through an angle of about 135° to a dumping position, and then automatically and freely rolling the vehicle back to its vertical position after unloading.

Another object of the present invention is to provide a tipple which is simple and inexpensive to construct and maintain.

A further object of the present invention is to provide a tipple which is capable of simple, rapid and efficient operation.

The foregoing objects are obtained by a tipple comprising a fixed support having two horizontal and parallel rails with inboard and outboard ends and a cradle assembly movably mounted on the fixed support. The cradle assembly includes two rocker members and means for supporting a vehicle on the rocker members. Each of the rocker members has a curved surface. The vehicle is supported on the rocker members such that the combined center of gravity of the vehicle and cradle assembly is located relative to the curved surfaces in order that the cradle assembly with a loaded vehicle thereon freely rolls from a normal, vertical position at the inboard end of the rails through an angle of about 135° to a dumping position at the rail outboard ends, and then automatically and freely rolls back to the vertical position after unloading of the vehicle contents. Each curved surface has a curvature in which the radial distances from the combined center of gravity of a loaded vehicle and cradle assembly to each curved surface decreases along the length of the curvature to accelerate the rolling of the cradle assembly.

The foregoing objects are also basically obtained by providing a tipple comprising a fixed support having two horizontal and parallel rails with inboard and outboard ends and a cradle assembly movably mounted on the fixed support. The cradle assembly comprises two rocker members and means for supporting the vehicle on the rocker members. The rocker members have curved surfaces which engage the rails. The vehicle is supported on the rocker members with the center of gravity of the vehicle and cradle assembly located relative to the curved surfaces such that the cradle assembly with a a loaded vehicle thereon freely rolls from a normal, vertical position at the rail inboard ends through an angle of about 135° to a dumping position at the rail outboard ends, and then automatically and freely rolls back to the vertical position after unloading. A spring mechanism is coupled at its opposite ends to the upper ends of the fixed support and the cradle assembly to prevent rolling of the cradle through an angle of greater than about 135° and to initiate rolling of the cradle assembly back to the vertical position after unloading.

By constructing the tipple of the present invention in this manner, a simply constructed tipple can efficiently dump the contents of a loaded vehicle. After the loaded vehicle has been driven onto the cradle assembly, the cradle assembly with the loaded vehicle thereon freely rolls under the force of gravity from its normal, vertical position through an angle of about 135° to its dumping position. This movement of the cradle assembly and vehicle is accomplished solely under the force of gravity without supplying power to the system. Once the load has been dumped, the vehicle automatically and freely rolls back to the normal, vertical position because of the relative positioning of the curvature and center of gravity of the cradle and now unloaded vehicle. This unloaded vehicle may then be driven off the tipple and another loaded vehicle may be driven thereon for unloading.

A spring arrangement can be coupled at its opposite ends to the fixed support and the cradle assembly to prevent the cradle assembly from rolling through an angle of greater than 135° and for initiating rolling to the vertical position after unloading. The return rolling is only initiated by the spring arrangement since such rolling occurs solely under the force of gravity.

Other objects, advantages and salient features of the present invention will become apparent from the following detailed description which, taken in conjunction with the annexed drawings, discloses a preferred embodiment of the present invention.

BRIEF DESCRIPTION OF THE DRAWINGS

Referring to the drawings which form a part of this origginal disclosure:

FIG. 3 is an end elevational view in section of the tipple of FIG. 1 in its dumping position; and FIG. 4 is a graphical illustration of the curvature of the curved surface of each rocker member.

DETAILED DESCRIPTION OF THE PREFERRED EMBODIMENT OF THE INVENTION

Figure 1:
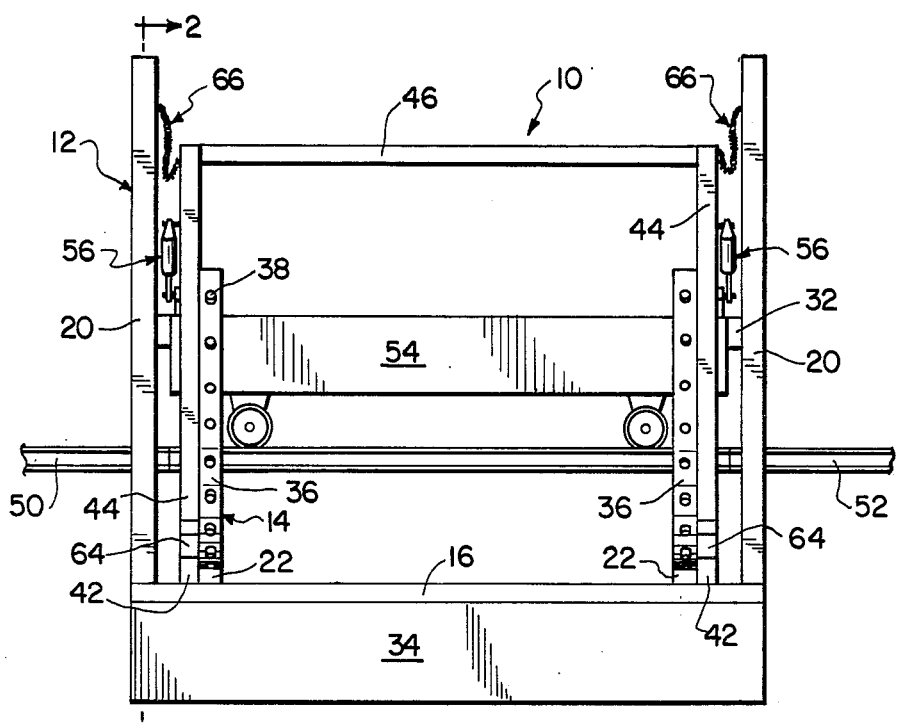
FIG. 1 is a side elevational view illustrating a tipple in acordance with the present invention.
Figure 2:
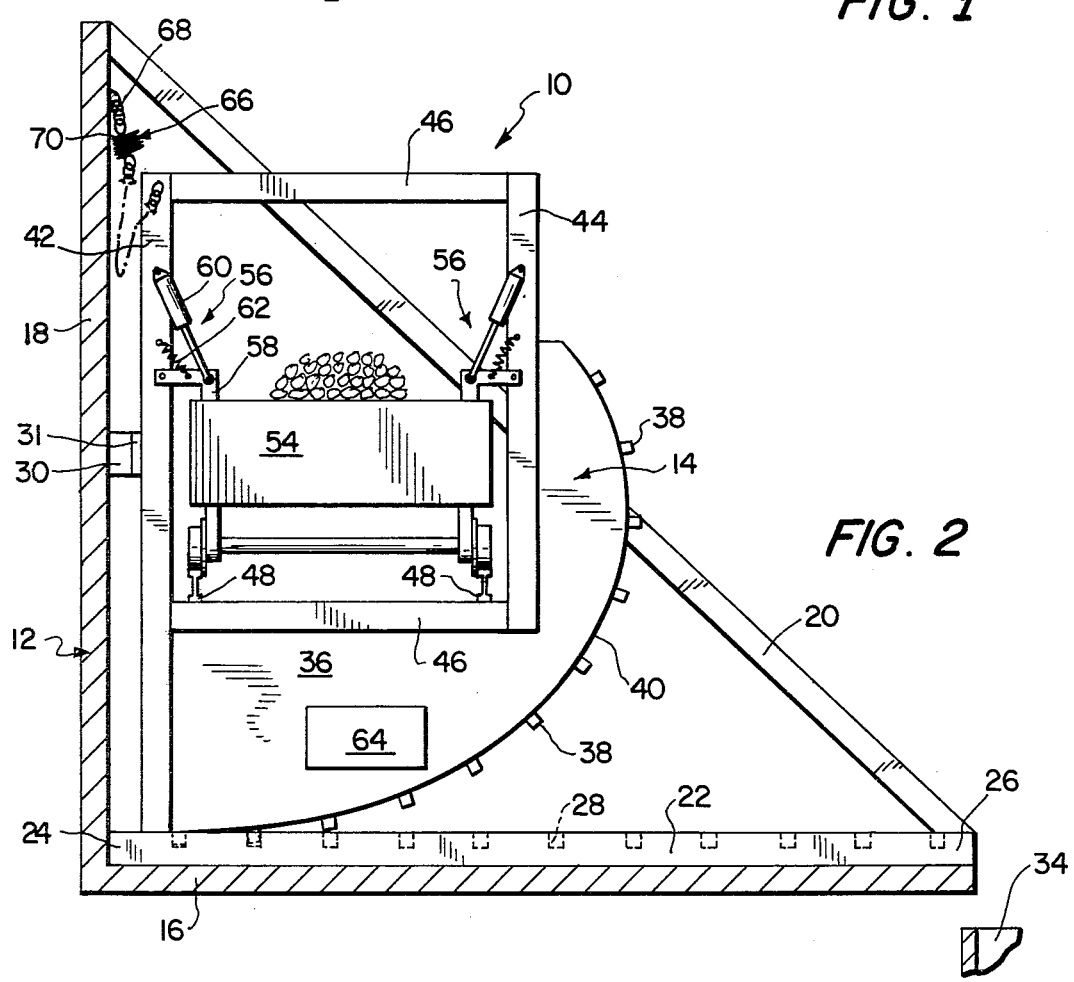
FIG. 2 is a partial end elevational view in section taken along lines 2—2 of FIG. 1 illustrating the tipple of FIG. 1 in its normal, vertical position.

Referring initially to FIGS. 1 and 2, the tipple 10 in accordance with the present invention, as illustrated, comprises a fixed support 12 and a cradle assembly 14 mounted for rolling on the fixed support. The fixed support comprises a framework including a horizontal support plate 16, two vertical posts 18 and two angle members 20. Vertical posts 18 extend upwardly from support plate 16 along an inboard edge thereof and are perpendicular to support plate 16. Angle members 20 are fixed at their opposite ends to the free ends of vertical posts 18 and support plate 16 to serve as bracing members.

Fixedly mounted on support plate 16 are two, horizontal and parallel rails 22. Each rail has an inboard end 24 adjacent vertical post 18 and an outboard end 26 remote from the vertical post. A series of recesses 28 are formed in the upper surface of the rails and are aligned along the longitudinal axes of the rails.

An electro-magnetic device 30 is mounted on a horizontal brace 32 of the framework of the fixed support 12. A ferromagnetic plate 31 is mounted on cradle assembly 14 for engaging device 30.

Located below horizontal plate 16 and adjacent outboard end 26 of rail 22 is a bin 34 or other means for receiving the material unloaded from the vehicles. Alternatively, a conveyor arrangement may be located below the outboard end of rails 22 for conveying the dumped material.

Cradle assembly 14 comprises two rocker members 36 which are movably mounted on rails 22 for rolling between inboard ends 24 and outboard ends 26. A plurality of projections 38 extend generally radially from the curved surface 40 of each rocker member. Curved surfaces 40 engage the upper surfaces of rails 22, while projections 38 are received within recesses 28 when rocker members 38 roll on rails 22 to prevent slippage therebetween. A cradle framework is mounted on and supported by rocker members 36 for supporting a vehicle on the rocker members. The cradle framework comprises inboard vertical members 42, outboard vertical members 44 and horizontal braces 46 extending between various vertical members 42, 44. Two parallel railroad tracks 48 are fixed to and span the gap between rocker members 36 and are fixed to the cradle framework. Tracks 48 are alignable with incoming tracks 50 and departing tracks 52 permitting a railroad car or other vehicle 54 to be driven onto and driven off of cradle assembly 14.

Clamping mechanisms 56 are mounted on each of the four vertical members 42, 44 of the cradle framework for detachably retaining a vehicle in place on cradle assembly 14. Each clamping mechanism 56 comprises a lever 58 pivotally mounted at one end to a cradle vertical member. The other end of lever 58 extends into the vehicle receiving area of cradle assembly 14. A fluid operated (pneumatic or hydraulic) piston and cylinder arrangement 60 is pivotally coupled at one end to the respective vertical member and at its other end to the end of lever 58 remote from its pivotal connection with the vertical member. A spring 62, fixed at its opposite ends to the vertical member and to the lever, biases lever 58 towards its upward or release position. Piston and cylinder arrangements 60 operate against the bias of springs 62 forcing levers 58 against car 54 to retain and lock car 54 in position on cradle assembly 14. Thus, piston and cylinder arrangements 60 and springs 62 permit rapid movement of levers 58 between their clamping and release positions.

Counterweights 64 of a suitable nature are fixed to lateral surfaces of rocker members 44. These counterweights are suitably located to assist in the movement of the cradle assembly.

Two flexible and extendable members 66 are fixed at their opposite ends to support 12 and cradle assembly 14 adjacent the upper ends of vertical posts 18 and inboard vertical members 42. Each flexible extendable member 66 comprises alternating chain link sections 68 and coil spring sections 70. Members 66 prevent cradle assembly 14 from rolling through an angle greater than about 135° and initiate return rolling of cradle assembly 14 to its vertical position after unloading of the contents of car 54.

The curvature of each curved surface 40 is formed such that the radial distance, between the combined center of gravity of a loaded vehicle properly mounted on cradle assembly 14 and points on curved surface 40, decreases along curved surface 40 in a direction away from rail 22 as viewed in FIG. 2. Specifically, the curvature is defined substantially by the formula:

$$Y = -0.034776\ X^5 + 0.488406\ X^4 - 2.3202\ X^3 + 4.37662\ X^2 - 2.68955\ X + 0.028074$$

wherein X equals a distance along an axis in a horizontal plane (i.e., along the length of rails 22 from inboard end 24 to outboard end 26) and Y equals a distance along an axis in a vertical plane (i.e., along inboard vertical member 42). The details of the curve are illustrated in FIG. 4. This curve has been developed from the following points:

| Point | X Component | Y Component |
|---|---|---|
| 1 | 0 | 0 |
| 2 | 1.0 | 0 |
| 3 | 2.0 | 0 |
| 4 | 2.5 | 0.05 |
| 5 | 3.0 | 0.1 |
| 6 | 4.0 | 0.5 |
| 7 | 5.0 | 1.1 |
| 8 | 5.7 | 2.0 |
| 9 | 6.0 | 3.0 |
| 10 | 6.05 | 3.3 |
| 11 | 5.9 | 4.1 |
| 12 | 5.5 | 5.0 |
| 13 | 5.35 | 5.2 |

These points have been utilized and analyzed as data to formulate the above computer generated formula.

The combined center of gravity of the vehicle and cradle assembly is located relative to curved surfaces 40 such that the cradle assembly with a loaded vehicle clamped on tracks 48 by clamping mechanisms 56 rolls freely from a normal, vertical position (illustrated in FIG. 2) at inboard ends 24 of rails 22 through an angle of about 135° to a dumping position (illustrated in FIG. 3) at outboard ends 24 of rails 22, and then automatically and freely rolls back to the vertical position after unloading the contents of car 54. Counterweights 64 are located on rocker members 36 adjacent to and on an outboard side of a vertical plane passing through the center of gravity of the vehicle.

Electro-magnetic device 30 retains cradle assembly 14 in the fully upright position illustrated in FIG. 2. The arrangement of the curvature of curved surfaces 40 relative to the unloaded vehicle-cradle assembly center of gravity causes the cradle assembly to tilt slightly to the right when no vehicle or an unloaded vehicle is mounted in the cradle assembly. Thus, electro-magnetic device 30 and plate 31 maintain cradle assembly 14 in its fully upright, vertical position to permit alignment of tracks 48 with incoming and departing tracks 50, 52 to facilitate loading and unloading of car 54 on cradle assembly 14 and to prevent premature tilting of cradle assembly 14 before the car has been properly located on the cradle assembly and retained in place by clamping mechanisms 56.

In operation, tipple 10 is initially positioned as illustrated in FIG. 2, except that the clamping mechanisms 56 are located in their upper or release positions. Electro-magnetic device 30 is actuated to maintain cradle assembly 30 in its normal, vertical position. With tracks 48 aligned with incoming tracks 50, a loaded car 54 is driven onto tracks 48, properly positioned on the tracks and retained in position by actuation of clamping mechanisms 56. In actuating clamping mechanisms 56, piston-cylinder arrangements 60 are extended to force levers 58 into engagement with car 54 against the bias of springs 62.

Once car 54 has been properly and positively retained in cradle assembly 14, electro-magnetic device 30 is deactivated to release cradle assembly 14 from fixed support 12 to permit relative movement therebetween. The relative configuration of curved surfaces 40, counterweights 64, and the combined gravity of the loaded car 54 and the cradle assembly cause cradle assembly 14 to roll generally clockwise on rails 22 from the normal, vertical position (illustrated in FIG. 2) at inboard ends 24 of rails 22 through an angle of about 135° to a dumping position (illustrated in FIG. 4) at outboard ends 26 of rails 22. In this dumping position, the particulate contents of car 54 are discharged from car 54 solely under the influence of gravity. The rolling of car 54 also results solely from the influence of gravity and is not caused by the supply of power thereto. During rolling of cradle assembly 14 with a loaded vehicle thereon, flexible extendable members 66 are stretched with springs 70 being axially tensioned.

Once the contends of car 54 have been discharged into bin 34, the weight of cradle assembly 14 and of the now empty car 54 therein decreases and the combined vehicle-cradle assembly center of gravity shifts, while springs 70 apply a force to cradle assembly 14 to initiate rolling in a generally counter-clockwise direction. The force applied by springs 70 as well as the shifting of the center of gravity, cause cradle assembly 14 to roll in a generally counterclockwise direction back to its normal, vertical position illustrated in FIG. 2. The momentum of the return rolling of cradle assembly 14 will cause the cradle assembly to roll past its rest, angular position and engagement of electro-magnetic device 30 and plate 31. Electro-magnetic device 30 is actuated during rolling of the car such that it will retain cradle assembly 14 in the normal, vertical position (illustrated in FIG. 2) when plate 31 of the cradle assembly engages it.

With the cradle assembly returned to its normal, vertical position, the empty car may now be released by clamping mechanism 56 and driven off the cradle assembly onto departing tracks 52. The clamping mechanisms are released by releasing the fluid pressure in piston and cylinder arrangements 60 permitting retraction under the bias of springs 62. Once the empty car has been removed from the cradle assembly, another loaded car may be positioned on the cradle assembly for emptying.

By forming the tipple of the present invention in this manner, the tipple may be simply and inexpensively constructed and operated. By arranging the curved surfaces 40, relative to the mounting of the vehicle such that the cradle assembly with a loaded vehicle freely rolls from a normal, vertical position to its dumping position and then automatically and freely back to its vertical position permits the tipple to operate using gravity, without the application of an external source of power thereto to cause rolling or tilting of the loaded vehicle. By forming the curved surface such that the rolling action of the vehical extends through an angle of about 135° facilitates unloading of the car contents in a rapid manner without modification to existing railroad cars.

While a particular embodiment has been chosen to illustrate the invention, it will be understood by those skilled in the art that various changes and modifications can be made therein without departing from the scope of the invention as defined in the appended claims.

What is claimed is:

1. A tipple, comprising:
   a fixed support having two horizontal and parallel rails with inboard and outboard ends; and
   a cradle assembly movably mounted on said rails, including
   two rocker members, each with a curved surface engaging one of said rails, and
   means for supporting a vehicle on said rocker members with a combined center of gravity of the vehicle and said cradle assembly located relative to said curved surfaces such that said cradle assembly with a loaded vehicle thereon freely rolls from a normal, vertical position at said inboard ends through an angle of about 135° to a dumping position at said outboard ends, and then automatically and freely rolls back to the vertical position after unloading,
   each said curved surface having a curvature in which radial distances from said combined center of gravity to each of said curved surfaces and radii of curvature of each said curved surface decrease along said curvature from an inboard end to an outboard end thereof.

2. A tipple according to claim 1, wherein said curvatures are substantially defined by $$Y = -0.034776\ X^5 + 0.488406\ X^4 - 2.3202\ X^3 + 4.37662\ X^2 - 2.68955\ X + 0.028074$$

wherein X equals a distance along an axis in a horizontal plane and Y equals a distance along an axis in a vertical plane.

3. A tipple according to claim 1, wherein counterweights are fixed to said rocker members.

4. A tipple according to claim 3, wherein said counterweights have a center of gravity located adjacent to but on an outboard side of a vertical plane passing through the center of gravity of the vehicle.

5. A tipple according to claim 1, wherein said fixed support and said cradle assembly are coupled adjacent upper ends thereof by extendable and flexible means, comprising alternating chain-link and spring sections, for preventing rolling of said cradle assembly through an angle greater than about 135°.

6. A tipple according to claim 1, and further comprising means, mounted on said fixed support, for detachably coupling said fixed support and said cradle assembly when said cradle assembly is in said vertical position.

7. A tipple according to claim 1, wherein said cradle assembly includes clamping means for detachably retaining a vehicle in place on said cradle assembly.

8. A tipple according to claim 7, wherein said clamping means comprises pivotally mounted levers and fluid operated piston and cylinder means, coupled to said lever and said cradle assembly, for moving said levers between clamping and release positions.

9. A tipple according to claim 1, wherein said curved surfaces and said rails have mating projections and recesses to prevent slippage therebetween during rolling.

10. A tipple according to claim 9, wherein said projections extend from said curved surfaces and said recesses are formed in said rails.

11. A tipple according to claim 1, wherein said radii of curvature decrease along said curvature from a bottom location to a top location in said vertical position.

12. A tipple, comprising:

a fixed support having two horizontal and parallel rails with inboard and outboard ends;

a cradle assembly movably mounted on said rails, and including two rocker members, each with a curved surface engaging said rails, and means for supporting a vehicle on said rocker members with a combined center of gravity of the vehicle and said cradle assembly located relative to said curved surfaces such that said cradle assembly with a loaded vehicle thereon freely rolls from a normal, vertical position at said inboard ends through an angle of about 135° to a dumping position at said outboard ends, and then automatically and freely rolls back to said vertical position after unloading, each said curved surface having a curvature in which radii of curvature decrease along said curvature from a bottom location to a top location in said vertical position; and spring means, coupled at opposite ends thereof to upper ends of said fixed support and said cradle assembly, for preventing rolling of said cradle assembly through an angle of greater than about 135° and for initiating rolling to said vertical position after unloading.

* * * * *